Figure 1:
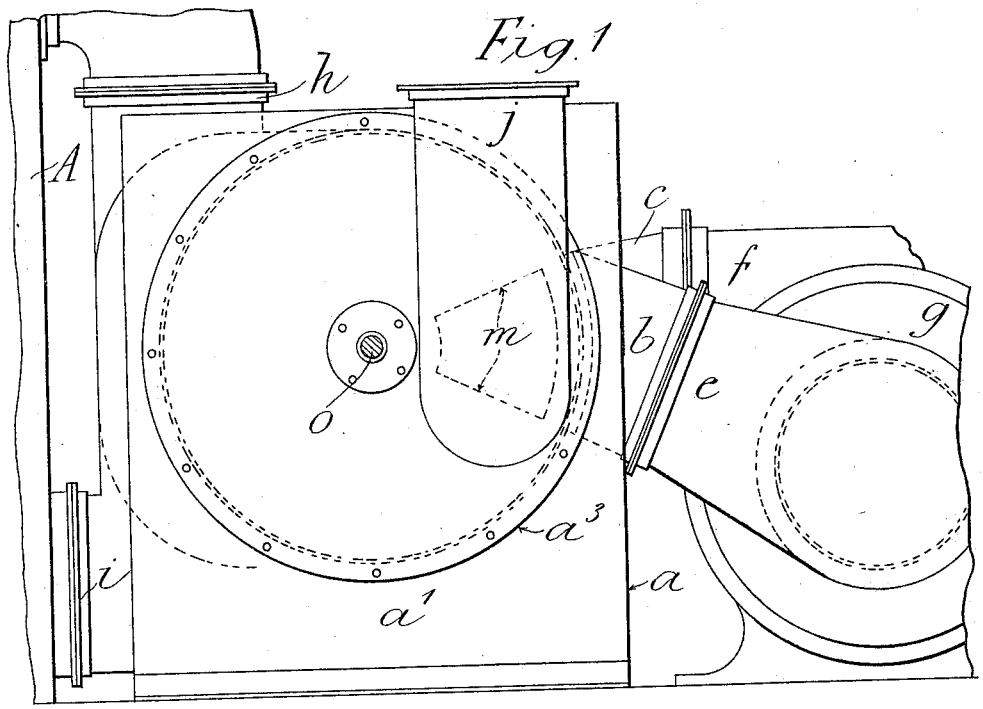

T. G. MARLOW.
APPARATUS SUITABLE FOR DRYING, HEATING, COOLING, OR VENTILATING.
APPLICATION FILED APR. 11, 1912.

1,102,599.

Patented July 7, 1914.
5 SHEETS—SHEET 1.

T. G. MARLOW.
APPARATUS SUITABLE FOR DRYING, HEATING, COOLING, OR VENTILATING.
APPLICATION FILED APR. 11, 1912.
1,102,599.
Patented July 7, 1914.
5 SHEETS—SHEET 2.
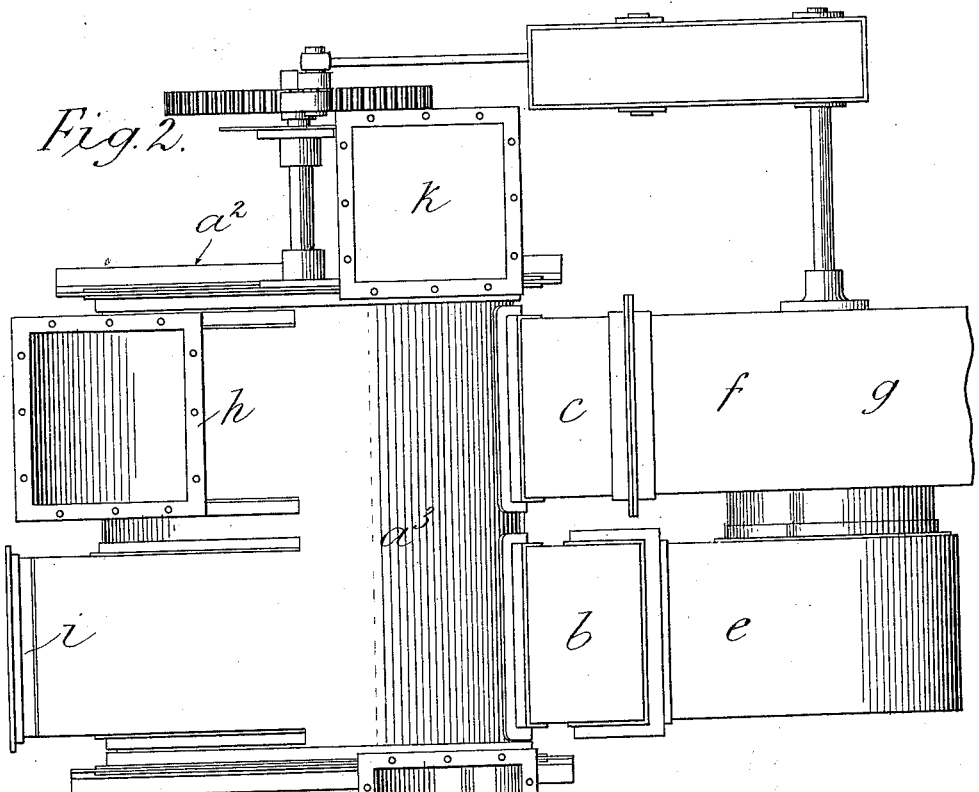
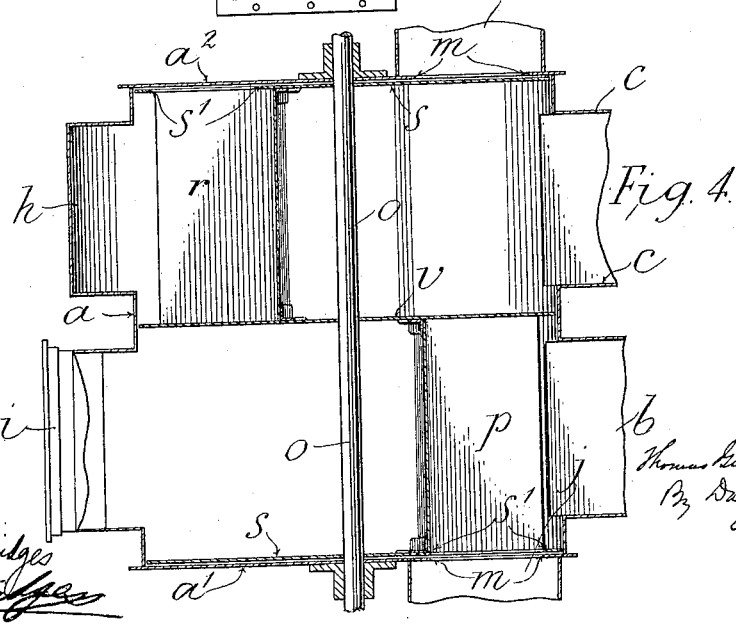

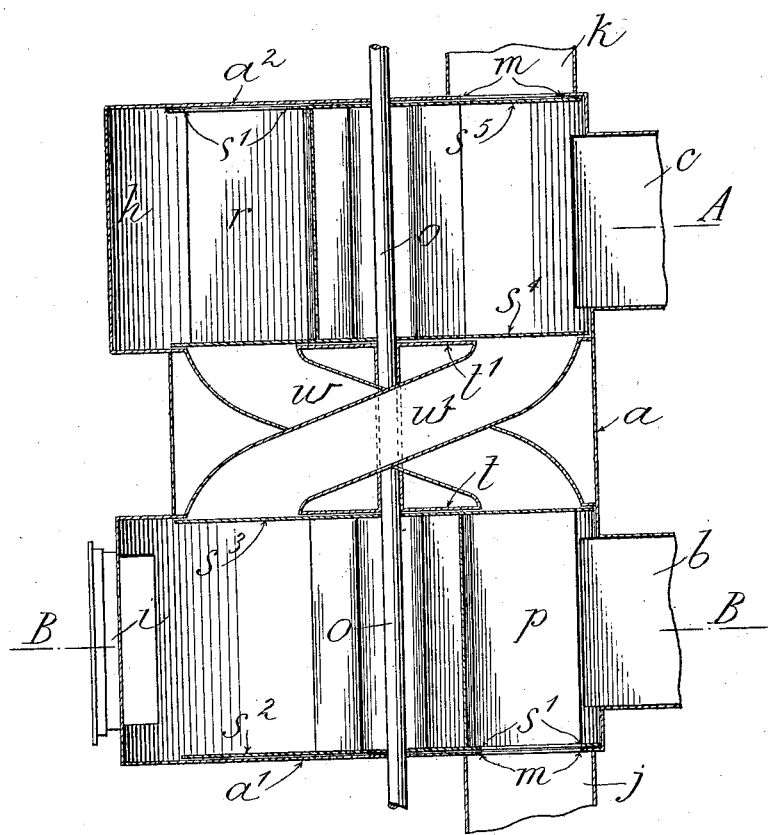

T. G. MARLOW.
APPARATUS SUITABLE FOR DRYING, HEATING, COOLING, OR VENTILATING.
APPLICATION FILED APR. 11, 1912.

1,102,599.

Patented July 7, 1914.
5 SHEETS—SHEET 4.

T. G. MARLOW.
APPARATUS SUITABLE FOR DRYING, HEATING, COOLING, OR VENTILATING.
APPLICATION FILED APR. 11, 1912.

1,102,599.

Patented July 7, 1914.
5 SHEETS—SHEET 5.

UNITED STATES PATENT OFFICE.

THOMAS GIBBONS MARLOW, OF LONDON, ENGLAND, ASSIGNOR TO THE PULSOMETER ENGINEERING COMPANY LIMITED, OF READING, ENGLAND.

APPARATUS SUITABLE FOR DRYING, HEATING, COOLING, OR VENTILATING.

1,102,599.   Specification of Letters Patent.   Patented July 7, 1914.

Application filed April 11, 1912. Serial No. 690,210.

*To all whom it may concern:*

Be it known that I, THOMAS GIBBONS MARLOW, a subject of the King of Great Britain and Ireland, residing at Streatham, in the county of London, England, have invented Improvements in or Relating to Apparatus Suitable for Drying, Heating, Cooling, or Ventilating, of which the following is a specification.

This invention has reference to the drying, heating or cooling of materials of various kinds or to the ventilation of places, by alternately supplying air or other gaseous fluid (hereinafter referred to as air) to one or more chambers (hereinafter referred to as the operating chamber) containing the material to be treated, or fluid to be moved, so as to produce a plenum in such chamber and afterward withdrawing air therefrom so as to produce a rarefaction therein, these operations being repeated as often as may be necessary to attain the desired result.

The primary object of the present invention is to enable the method aforesaid to be modified, when necessary, by causing the air within the chamber to move along or circulate in the chamber while a plenum is produced therein, or while a rarefaction is produced therein, or both when a plenum and when a rarefaction have been produced therein, and likewise to enable the direction of the air currents to be reversed, if necessary, for the purpose of enabling the conditioned air the better to come into intimate and effective contact with the material under treatment.

A further object of the invention is to provide simple and cheap constructions of apparatus for the purpose in view. To this end, there are employed in conjunction with the operating chamber, a single fluid exhausting and blowing device, such as a fan, and an air controlling arrangement so constructed that air can be delivered from the fan into the operating chamber while the outlet thereof is closed, so as to produce a plenum therein and so that air can afterward be withdrawn from the chamber while the inlet thereof is closed so as to produce a rarefaction therein. To enable circulation or movement of air to take place in the chamber and among the goods therein when a plenum is produced therein, or when a rarefaction is produced therein, the air controlling arrangement is so constructed that the inlet and outlet of the operating chamber can, at the required times, be placed simultaneously in connection respectively with the delivery and suction ducts of the fan. To enable the direction of the air currents to be reversed, the air controller may be so constructed as to allow of the simultaneous connection of the inlet of the operating chamber to the suction of the fan and the outlet of the operating chamber to the delivery of the fan.

An air controlling arrangement to act in either of the ways described can be constructed in various forms.

Figure 3:
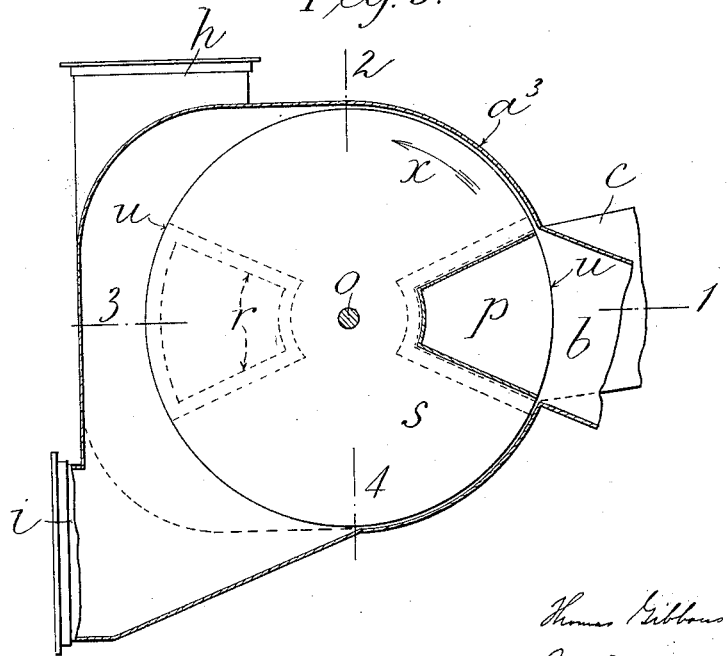
Figure 6:
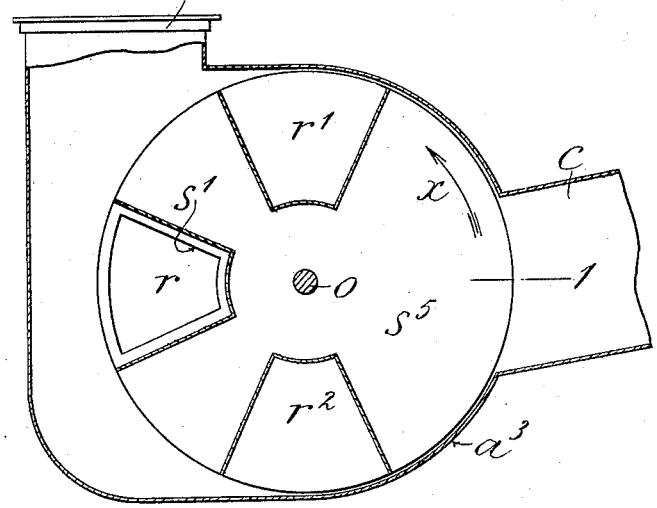
Figure 7:
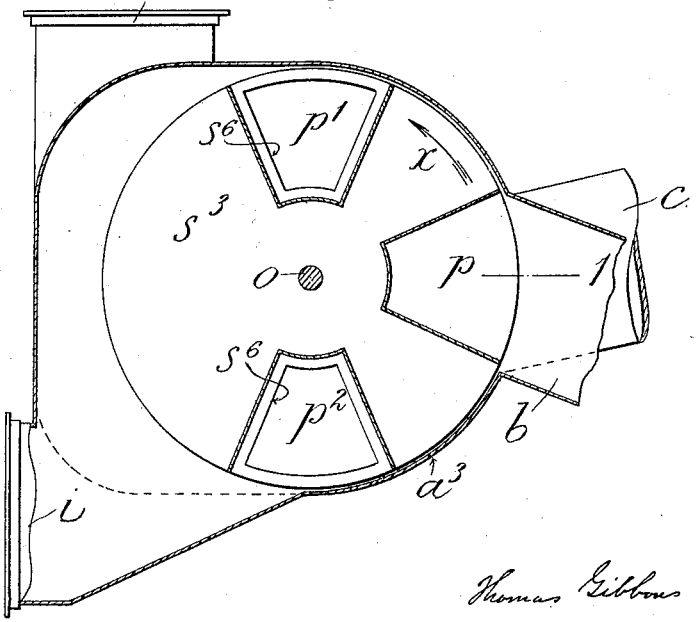
Figure 8:
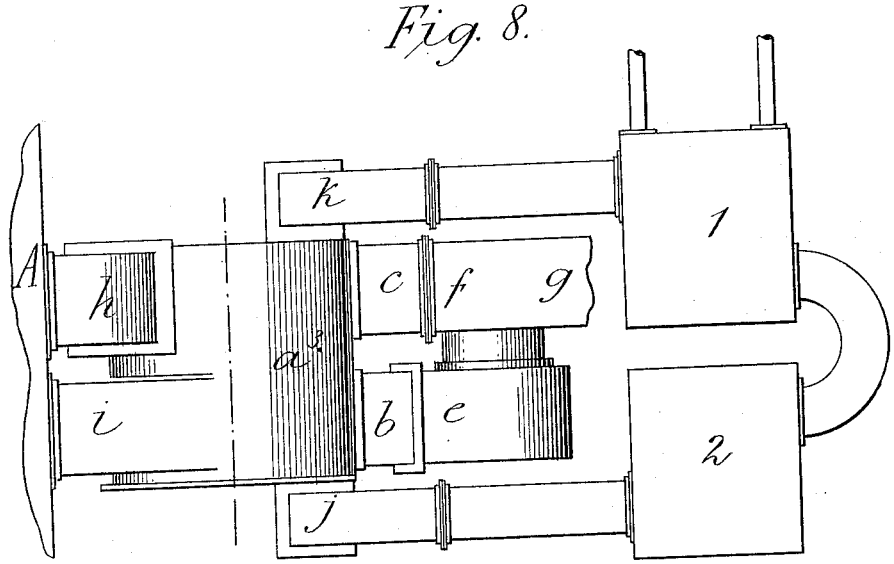

In the accompanying drawings, Figure 1 is a side elevation and Fig. 2 a plan of one constructional arrangement adapted to enable a plenum and then a rarefaction to be produced in a chamber with a circulation of the air in each circumstance. Fig. 3 is an end view of the rotary part of the air controller with its stationary casing in section. Fig. 4 is a horizontal section of the air controller. Fig. 5 is a similar view to Fig. 4 and Figs. 6 and 7 are vertical sections corresponding to the lines A A and B B respectively of Fig. 5, showing a construction of reversible air controller. Fig. 8 is a view showing diagrammatically a modified arrangement.

As shown in Figs. 1 to 4, the air controller comprises a casing $a$ having two lateral branches $b$ and $c$ for permanent connection to the suction and delivery ducts $e$ and $f$ respectively of a fan $g$, two branches $h$ and $i$ for connection to the inlet and outlet respectively of the operating chamber, part of which is shown at A, and separate suction and delivery branches $j$ and $k$ carried by the respective end walls $a^1$, $a^2$ of the casing $a$, each of these walls having a hole or port $m$ therethrough (Figs. 1 and 4) communicating with the corresponding separate suction or delivery branch $j$ or $k$. Mounted to revolve centrally within a cylindrical portion $a^3$ of the casing $a$ is a shaft $o$ carrying valves, namely a suction valve $p$ and a delivery valve $r$, each in the form of a bucket or pocket shaped device arranged lengthwise of the shaft and carried by an outer disk $s$, arranged to revolve in close contact with the adjacent ported end wall $a^1$ or $a^2$ of the casing $a$, and by an intermediate disk $v$ common to the two valves, one end of each bucket shaped device being closed, as by the intermediate disk $v$, and the other being open and in line with a hole or port $s^1$ in the corresponding disk $s$. The outer peripheral edges $u$ of each valve $p$ and $r$ are arranged to revolve in close proximity to the interior of the cylindrical portion $a^3$ of the casing $a$. The shaft $o$ may be driven in any desired way. Conveniently, it may be driven at a comparatively slow and continuous speed through reduction gearing at $g^1$ from the shaft $g^2$ of the fan $g$ so that it acts automatically.

The hole $m$ in each end wall $a^1$, or $a^2$ of the casing $a$ and the hole $s^1$ in the adjacent valve disk $s$ may be of any suitable shape and size, and the bucket or pocket shaped devices $p$ and $r$ be spaced apart and be of such size in a circumferential direction, as to enable the desired air control to be obtained. In the example shown, the two valves $p$ and $r$ are so constructed and arranged that when the air controller is connected up to the fan $g$ and the operating chamber A and the fan and combined rotary valves set in motion, air will be drawn by the fan from a space external to the fan and operating chamber through the suction branch $j$, the adjacent port $m$ in the wall $a^1$ and the corresponding suction valve $p$ which at this time closes the communication between the suction $e$ of the fan and the branch $i$ connected to the outlet of the operating chamber, the air so drawn in being discharged into the operating chamber through the controller casing $a$ past the delivery valve $r$ which will then be in a position to allow of free communication between the fan and operating chamber, a plenum being then set up in the latter. This condition obtains when the rotary valves are in the position illustrated, that is to say, when the valve $p$ is at position 1 in Fig. 3. On continued rotation of the combined valves $p$ and $r$ in the direction of the arrow $x$ to position 2, the disk $s$ will close communication with the external space through the suction branch $j$ and place the suction branch $e$ of the fan in direct communication with the operating chamber while the latter will be in direct communication with the delivery branch $f$ of the fan so that the air under pressure will be caused to circulate or move through the operating chamber and among goods therein. After this has continued for a predetermined time, and the valves arrive in position 3, the disk $s$ will disconnect the delivery passage $f$ of the fan from the operating chamber and place it in communication with the external space through the port $m$ in the adjacent side $a^2$ of the casing $a$ and the separate delivery branch $k$ (Fig. 2) so that air will then be withdrawn from the chamber and discharged into the external space, a rarefaction being thus set up in the said chamber that will facilitate evaporation of moisture from the goods therein, assuming them to be moist. After this has continued for the required time, the valves will have arrived in position 4 in which the delivery branch $f$ of the fan is again in communication with the operating chamber while that chamber is in communication with the exhaust passage $e$ of the fan so that rarefied air within the chamber will be caused to circulate or move therein. Upon further rotation of the combined valves they will arrive in position 1 again when the above described operations will be repeated.

The operation or arrangement of the valves may be such that the operating chamber will only be placed in communication at the same time with the suction and delivery of the fan, for causing circulation of air in the chamber, while a plenum, or while a rarefaction, exists in the chamber. For this purpose in the first case the combined valves $p$ and $r$ may be moved rapidly, from position 3 to position 1 in the direction of the arrow $x$ (Fig. 3), so as not to remain in position 4, and in the second case, the valves may be moved rapidly from position 1 to position 3 so as not to remain in position 2. Or the operation or arrangement of the controller may be such that both the inlet and outlet of the chamber are never simultaneously in connection with the delivery and suction of the fan for a sufficient time to enable continuous circulation of air to be set up in the chamber. This may be effected by moving the valves $p$ and $r$ rapidly from position 1 to position 3 and from the latter position back to position 1.

When it is desired to reverse the direction of the air circulating in the operating chamber, the air controller is adapted to connect the inlet and outlet of the operating chamber to the suction and delivery of the fan at the required times. This may be done in the cases of an air controller such as hereinbefore described, by arranging within the cylindrical casing, between the suction and delivery valves hereinbefore referred to, a partition or distance piece having cross-over ports or passages adapted to effect, with the aid of suitable valves, as through ports in the inner end walls thereof, the desired connections at the required times. This is exemplified in Figs. 5 to 7 where there are arranged between the branches $b$ and $i$ of the air controller three bucket shaped devices $p$, $p^1$, $p^2$ carried by rotary disks $s^2$, $s^3$, and between the branches $c$ and $h$ three bucket shaped devices $r$, $r^1$, $r^2$ carried by rotary disks $s^4$, $s^5$, the several disks being fixed to the rotary shaft $o$. Between the disks $s^3$ and $s^4$ are two stationary plates $t$, $t^1$ formed with pairs of ports, that are connected by cross connected passages $w$ and $w^1$. The end walls $a^1$, $a^2$ of the casing $a$ are formed with ports $m$, as before, communicating with branches $j$ and $k$, and the disks $s^2$ and $s^5$ have openings $s^1$ therein at the outer sides of the devices $p$ and $r$ to register with the ports $m$ at the required time, as in the arrangement shown in Figs. 1 to 4 inclusive. The devices $p^1$ and $p^2$ are closed at their outer sides by the disk $s^2$ but are open at their inner sides through ports $s^6$ that are cut in the disk $s^3$ and arranged to simultaneously register with the reversing ports and passages $w$, $w^1$ at the required times. The devices $r^1$ and $r^2$ are closed at their outer sides by the disk $s^5$ but are open at their inner sides through ports that are cut in the disk $s^4$ and arranged to simultaneously register with the reversing ports and passages $w$, $w^1$ at the required times. With the construction and arrangement of parts described, when the connected rotary valve devices and disks, rotating in the direction of the arrow $x$, are in the position illustrated, called position 1 (Figs. 6 and 7), air will be drawn by the fan through the branch $j$, port $m$, valve device $p$ and branch $b$ and delivered through the branch $c$, casing $a$ and branch $h$ into the operating chamber so as to produce a plenum in that chamber. When the valve devices and disks have moved through about one eighth of a revolution from position 1, the suction and delivery branches $b$ and $c$ of the fan will be in direct communication through the casing $a$ and branches $i$ and $h$ with the operating chamber so that the air under plenum will be circulated through that chamber in the direction in which the air was previously delivered into that chamber. When the valve devices and disks have moved through another eighth of a revolution, the valve devices $p^1$, $p^2$ and $r^1$, $r^2$ will reverse the connections between the suction and delivery branches $b$ and $c$ of the fan and the branches $i$ and $h$ of the chamber through the reversing passages $w$ and $w^1$ so that the air under plenum will then be circulated in the opposite direction through the operating chamber. When the valve devices have moved through another two eighths of a revolution, air will be drawn from the operating chamber direct through the branches $i$ and $b$ and casing $a$ and delivered through branch $c$, valve device $r$ and port $m$ and branch $k$ to the exterior of the air controller, thereby producing a rarefaction in the operating chamber. When the valve devices and disks have moved through another eighth of a revolution, the branches $b$ and $c$ will be in direct communication through the casing $a$ with the branches $i$ and $h$ and rarefied air will be circulated through the operating chamber in the direction in which the air was withdrawn from the chamber to produce rarefaction. When the said valve devices and disks have moved through another eighth of a revolution, the valve devices $p^1$, $p^2$ and $r^1$, $r^2$ will reverse the connections between the branches $b$ and $c$ of the fan and the branches $i$ and $h$ of the chamber through the reversing passage $w$ and $w^1$ so that the rarefied air will be caused to circulate in the reverse direction through the chamber. Upon the valve devices and disks moving through another two eighths of a revolution the above described operation will recommence.

The separate suction branch $j$ of the air controller may be placed in communication with the external atmosphere, or with a source from which conditioned air, (which expression is intended to include heated or cooled dry or moist air or steam) can be drawn as may be desired. Or the separate suction and delivery branches $j$ and $k$ respectively may be both connected to the external atmosphere as in the arrangement hereinbefore described. Or they may be connected up with heating, drying or cooling apparatus, or with heating and drying apparatus, to form a closed circuit with the fan. Thus, Fig. 8 shows apparatus of the kind hereinbefore described having its branches $j$ and $k$ connected in series with a refrigerator 1 to remove moisture from the air flowing therethrough, and a heater 2 to reheat the air flowing therethrough. Apparatus constructed and operating as hereinbefore described may also be used for ventilating rooms or other confined spaces or places, for example underground tube railways.

What I claim is:—

1. In combination, an operating chamber, a fan, and controlling means adapted, in one position, to connect the delivery of the fan to the operating chamber to establish a plenum therein, and, in another position, to maintain the delivery connection as aforesaid while connecting the inlet of the fan to the operating chamber to circulate the medium in a state of plenum.

2. In combination, an operating chamber, a fan, and controlling means adapted, in one position, to connect the inlet of the fan to the operating chamber to produce a rarefaction therein, and, in another position, to maintain the suction connection as aforesaid while connecting the delivery of the fan to the operating chamber to circulate the medium in a state of rarefaction.

3. In combination, an operating chamber, a fan, and controlling means adapted, in one position, to connect the delivery of the fan to the operating chamber to establish a plenum therein, in another position to maintain the delivery connection as aforesaid while connecting the inlet of the fan to the operating chamber to circulate the medium in a state of plenum, in a further position to disconnect the delivery of the fan from the operating chamber while maintaining the inlet connection as aforesaid to produce a rarefaction in the operating chamber and in a still further position to again connect the delivery of the fan to the operating chamber while maintaining the inlet connection to circulate the medium in a state of rarefaction.

4. In combination, an operating chamber, a fan adapted to have its suction and delivery connected to different parts of the chamber and controlling means adapted, in one position, to connect the delivery of the fan to one part of the chamber while disconnecting the suction therefrom in order to establish a plenum in the chamber, in another position to connect both the delivery and suction to the chamber to circulate the medium in a state of plenum in the same direction as that adopted in establishing the plenum, and in yet another position to reverse the connection of the delivery and suction of the fan to the parts of the chamber in order to reverse the direction of such circulation.

5. In combination, an operating chamber, a fan adapted to have its suction and delivery connected to different parts of the chamber and controlling means adapted, in one position to connect the delivery of the fan to one part of the chamber while disconnecting the suction therefrom in order to establish a plenum in the chamber, in another position to connect both the delivery and suction to the chamber to circulate the medium in a state of plenum in the same direction as that adopted in establishing the plenum; in a third position to reverse the connection of the delivery and suction of the fan to the parts of the chamber in order to reverse the direction of such circulation; in a fourth position to disconnect the delivery of the fan from the operating chamber while maintaining the inlet connection last referred to in order to produce a rarefaction in the operating chamber, in a fifth position to again connect the delivery of the fan to the operating chamber, while maintaining the inlet connection, to circulate the medium in a state of rarefaction and in a final position to reverse the connections of the delivery and suction of the fan to the delivery chamber to reverse the direction of circulation of the fluid medium in a state of rarefaction.

6. In combination, an operating chamber, a fan, a controller casing having branches connected to separate parts of the operating chamber, branches connected respectively to the suction and delivery of the fan and independent inlet and exhaust branches, and a controller in said casing comprising bucket valves adapted at one time to connect the fan suction branch to the independent inlet branch, at another time to connect the fan delivery branch to the independent outlet branch and at still another time to interrupt both such connections.

7. In combination, an operating chamber, a fan, a controller casing having branches connected to separate parts of the operating chamber, branches connected respectively to the suction and delivery of the fan and independent inlet and exhaust branches and a controller in said casing comprising bucket valves associated with cross connected passages adapted to establish communication between the fan suction and delivery branches and the branches leading to separate parts of the operating chamber alternately in reversed order, for the purpose specified.

8. In combination, an operating chamber, a fan, a controller casing having branches connected to separate parts of the operating chamber, branches connected respectively to the suction and delivery of the fan and independent inlet and exhaust branches, bucket valves in said casing adapted, at one time, to connect the fan suction branch to the independent inlet branch, at another time to connect the fan delivery branch to the independent outlet branch and at still another time to interrupt both such connections, and bucket valves associated with cross connected passages adapted to establish communication between the fan suction and delivery branches and the branches leading to separate parts of the operating chamber alternately in reversed order, for the purpose specified.

9. An air controller of the kind described, comprising a casing, a pair of branches at one side thereof, an inlet branch and an outlet branch constituting a second pair of branches arranged at the opposite side of the casing, an end wall for the casing having an inlet branch adjacent to the outlet branch of the second pair of branches, an opposite end wall for the casing having an outlet branch adjacent to the inlet branch of the second pair of branches and a rotary carrier having a pair of bucket valves each open at one end as well as peripherally in order to successively connect the branches in the end walls with their companion outlet and inlet branches constituting the second pair thereof.

10. An air controller of the kind described, comprising a casing, a pair of branches at one side thereof, an inlet and an outlet branch constituting a second pair of branches arranged at the opposite side of the casing, an end wall for the casing having an inlet branch adjacent to the outlet branch of the aforesaid second pair of branches, an opposite end wall for the casing having an outlet branch adjacent to the inlet branch of the aforesaid second pair of branches and a rotary carrier having a pair of bucket valves displaced longitudinally with respect to the axis of rotation of the carrier, each bucket valve being open at one end as well as peripherally in order to successively connect the branches in the end walls with their companion outlet and inlet branches at one side of the casing.

11. An air controller of the kind described, comprising a casing, a pair of branches at one side thereof, an inlet and an outlet branch in horizontal alinement at the opposite side of the casing, twin partitions in the casing separating the inlet branch at one side and one branch at the opposite side from the remaining pair of branches, and each such partition having a pair of alined ports, ducts cross connecting such ports, a rotary carrier in said casing, a pair of peripherally-open bucket valves diametrically arranged with respect to the axis of rotation of the carrier but displaced longitudinally with respect to such axis and each having an end open to register with one end of one of the cross connecting ducts between the twin partitions, and a similar pair of bucket valves bilaterally symmetrical with the aforesaid pair of valves and associated with the other cross connecting duct so that their open ends simultaneously register with its ends.

12. An air controller of the kind described, comprising a casing, a pair of branches at one side thereof, an inlet and an outlet branch in horizontal alinement at the opposite side of the casing, an end wall for the casing having an inlet branch adjacent to and in horizontal alinement with the outlet branch of the aforesaid pair of alined branches, an opposite end wall for the casing having an outlet branch adjacent to and in horizontal alinement with the inlet branch of the aforesaid pair of alined branches, a rotary carrier having a pair of bucket valves diametrically arranged with respect to the axis of rotation of the carrier but displaced longitudinally with respect to said axis, each bucket valve being open at one end as well as peripherally in order to successively connect the branches in the end walls with their companion branches of the alined pair at one side of the casing, twin partitions in the casing separating the bucket valves aforesaid and each having a pair of alined ports, ducts cross connecting such ports, a further pair of bucket valves similar to those aforesaid but angularly displaced with respect thereto and each having an end open to register with one end of one of the cross connecting ducts between the partitions, and a still further pair of bucket valves bilaterally symmetrical with the last named pair of valves and associated with the other cross connected duct so that their open ends simultaneously register with its ends.

Signed at London England this 27th day of March 1912.

THOMAS GIBBONS MARLOW.

Witnesses:
R. WESTACOTT,
O. J. WORTH.

Copies of this patent may be obtained for five cents each, by addressing the "Commissioner of Patents, Washington, D. C."